US008907937B2

(12) United States Patent
Yun

(10) Patent No.: US 8,907,937 B2
(45) Date of Patent: Dec. 9, 2014

(54) DISPLAY APPARATUS AND METHOD FOR NOTIFYING USER OF STATE OF EXTERNAL DEVICE

(75) Inventor: Young-kyan Yun, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1492 days.

(21) Appl. No.: 12/015,864

(22) Filed: Jan. 17, 2008

(65) Prior Publication Data

US 2008/0303785 A1   Dec. 11, 2008

(30) Foreign Application Priority Data

Jun. 5, 2007   (KR) .............................. 10-2007-55089

(51) Int. Cl.
G09G 5/00 (2006.01)
G06F 3/038 (2013.01)
G06F 3/00 (2006.01)
G06F 3/14 (2006.01)

(52) U.S. Cl.
CPC .......... G09G 5/006 (2013.01); G09G 2330/022 (2013.01); G06F 3/14 (2013.01)
USPC .............. 345/211; 345/213; 345/1.2; 710/15; 710/17; 710/18; 710/19

(58) Field of Classification Search
USPC ........... 345/211, 213, 1.2; 710/15, 17–19, 38, 710/62, 63
See application file for complete search history.

(56) References Cited

U.S. PATENT DOCUMENTS

| 6,069,619 | A | 5/2000 | Kim | |
|---|---|---|---|---|
| 6,535,217 | B1* | 3/2003 | Chih et al. | 345/519 |
| 6,597,565 | B1* | 7/2003 | Kluth et al. | 361/679.23 |
| RE38,537 | E | 6/2004 | Kim | |
| 7,262,706 | B2* | 8/2007 | Yang et al. | 340/656 |
| 7,856,515 | B2 | 12/2010 | Kim et al. | |
| 2002/0062456 | A1 | 5/2002 | Mariaud et al. | |
| 2004/0025188 | A1 | 2/2004 | Bertin et al. | |
| 2005/0225547 | A1* | 10/2005 | Choi | 345/211 |
| 2006/0146485 | A1* | 7/2006 | Stancil | 361/621 |
| 2006/0230360 | A1 | 10/2006 | Young et al. | |

(Continued)

FOREIGN PATENT DOCUMENTS

CN  1896755 A  1/2007
EP  1 739 545 A2  1/2007

(Continued)

OTHER PUBLICATIONS

Chinese Office Action issued Aug. 24, 2011 in corresponding Chinese Patent Application No. 200810088440.1.

(Continued)

Primary Examiner — Ilana Spar
(74) Attorney, Agent, or Firm — Sughrue Mion, PLLC

(57) ABSTRACT

A display apparatus for displaying the state of an external device and a method thereof are provided. According to the present invention, messages indicating the connection state, the power state and the sleep mode of the external device are displayed on a screen of the display apparatus to which a USB is applied. Therefore, the state of an external device which inputs a video signal to the display apparatus, may be shown on the screen, and thus a user can easily know the state of the external device.

21 Claims, 5 Drawing Sheets

(56) References Cited

U.S. PATENT DOCUMENTS

| | | |
|---|---|---|
| 2007/0004270 A1 | 1/2007 | Kim et al. |
| 2007/0055772 A1* | 3/2007 | Yang ............................ 709/224 |
| 2008/0106537 A1* | 5/2008 | Chiu ............................. 345/211 |

FOREIGN PATENT DOCUMENTS

| | | | |
|---|---|---|---|
| EP | 1739545 | A2 * | 1/2007 |
| KR | 10-0139302 | B1 | 2/1998 |
| KR | 10-0362478 | B1 | 11/2002 |
| KR | 10-0690581 | B1 | 3/2007 |

OTHER PUBLICATIONS

Summons to attend oral proceedings, issued Oct. 12, 2011 in corresponding European Patent Application No. 08103193.2.

Communication dated Jul. 24, 2014 issued by the Korean Intellectual Property Office in counterpart Korean Patent Application No. 10-2007-0055089.

* cited by examiner

DISPLAY APPARATUS AND METHOD FOR NOTIFYING USER OF STATE OF EXTERNAL DEVICE

CROSS-REFERENCE TO RELATED APPLICATIONS

This application claims priority from Korean Patent Application No. 10-2007-0055089, filed on Jun. 5, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to notifying a user of the state of an external device, and more particularly, to a display apparatus which displays video input from an external device such as a personal computer (PC) so that a user can view the video.

2. Description of the Related Art

Display apparatuses, such as liquid crystal displays (LCDs), plasma display panels (PDPs) and cathode-ray tubes (CRTs), are used to display signals transmitted from external devices such as personal computers (PCs) on screens. Such display apparatuses process video signals which are transmitted from the external devices via connection units using various standards and display the processed signals on screens.

If the display apparatus is not connected to the external device, the video signal may not be received from the external device and hence, no information can be displayed on the display apparatus. Accordingly, it is difficult for users to exactly recognize the connection state of the external device, which may cause an inconvenience to the users. Inventions designed to solve these problems have been disclosed in Korean Patent No. 0139302 and U.S. RE No. 38,537.

However, even when the display apparatus is connected to the external device, if the external device is operated in a display power management signaling (DPMS) mode, that is, in a sleep mode, or if the video signal is not received from the external device due to the external device being turned off, there is no way of knowing the state of the external device. In other words, a user cannot determine whether the external device is switched on or off, is in a sleep mode, or is connected to the display apparatus, which could be an inconvenience to the user.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a display apparatus and a method thereof, which detects whether the external device is switched on or off, is in sleep mode, or is connected to the display apparatus, and informs a user of the state of the external device.

According to an aspect of the present invention, there is provided a display apparatus comprising a display unit which displays a video signal received from an external device; a connection unit which comprises a first pin connected to a power terminal of the external device and a second pin connected to a ground terminal of the external device; and a processor which detects the power state and the connection state of the external device through the first pin and the second pin, respectively, and generates messages to display the power state and the connection state of the external device on the display unit.

The display apparatus may further comprise a power supply unit which supplies a power source to the connection unit. The connection unit may comprise a connector comprising the first pin and second pin, and a pull-up resistor which is connected between the second pin and the power supply unit.

The connection unit may comprise a connector which complies with the universal serial bus (USB) standard.

If the first pin is high and the second pin is low, the processor may determine that the external device is in a display power management signaling (DPMS) mode. If the first pin and second pin are both low, the processor may determine that the external device is turned off. If the first pin is low and the second pin is high, the processor may determine that the external device is not connected.

The processor may first determine whether the video signal is received from the external device, and then detect the respective connection states of the first pin and the second pin.

The processor may determine whether the video signal is received from the external device based on whether a Transition Minimized Differential Signaling (TMDS) video signal is input.

According to another aspect of the present invention, there is provided a method for displaying the state of an external device in a display apparatus comprising a connector comprising a first pin connected to a first terminal of the external device and a second pin connected to a second terminal of the external device, the method comprising detecting the state of the external device through the first pin and the second pin; and displaying messages indicating the state of the external device on a screen.

The first terminal may be a power terminal of the external device, and the second terminal may be a ground terminal of the external device.

The connector may comprise a connector which complies with the universal serial bus (USB) standard.

If the voltage level of the first pin is high and the voltage level of the second pin is low, the detecting may comprise determining that the external device is in a display power management signaling (DPMS) mode. If the voltage level of the first pin and the voltage level of the second pin is low, the detecting may comprise determining that the external device is turned off. If the voltage level of the first pin is low and the voltage level of the second pin is high, the detecting may comprise determining that the external device is not connected.

The method may further comprise determining whether the video signal is received from the external device, before the step of detecting the state of the external device through the first pin and the second pin.

The determining may comprise determining whether the video signal is received from the external device based on whether a Transition Minimized Differential Signaling (TMDS) video signal is input.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
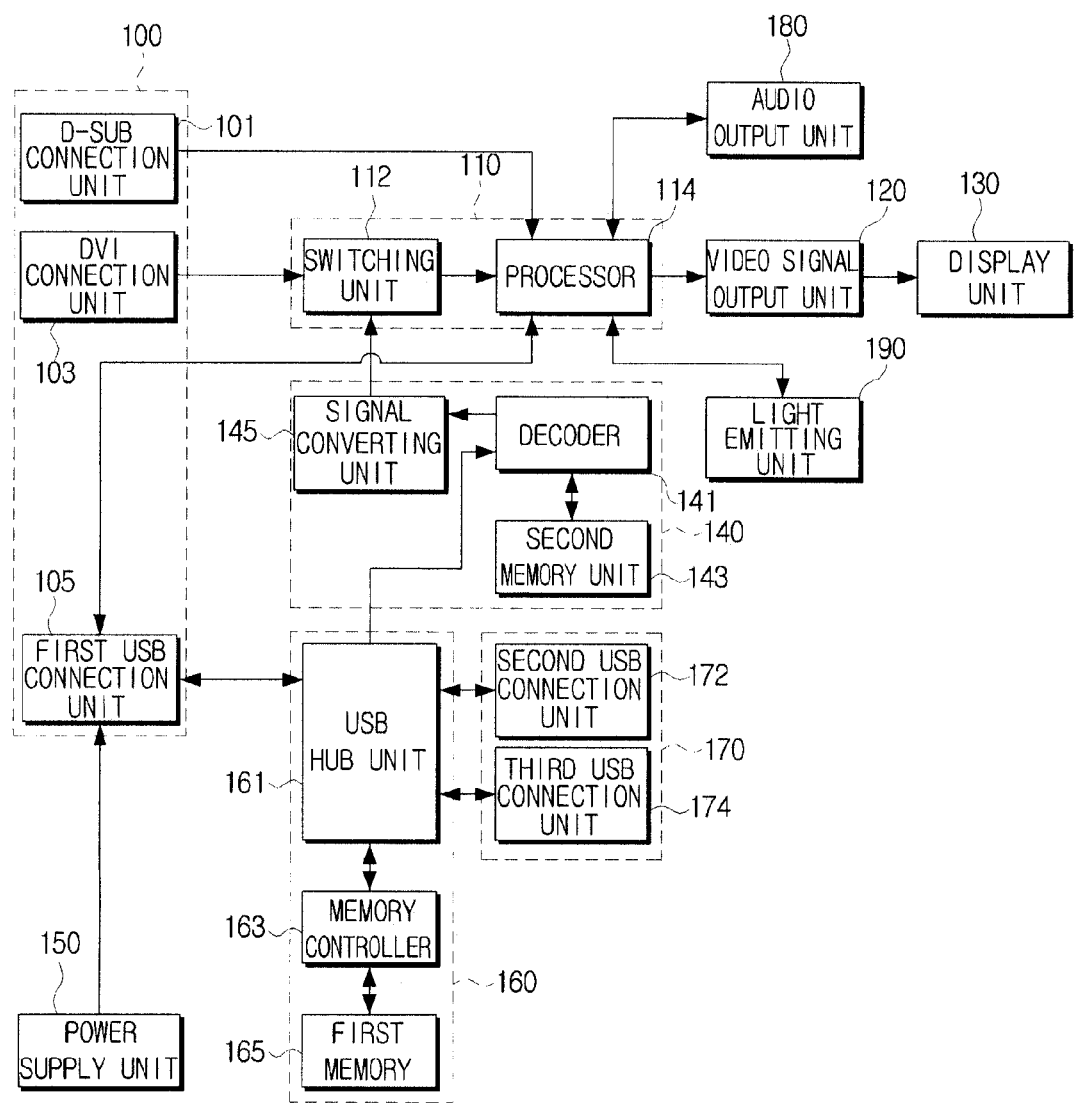
FIG. 1 is a view schematically showing a display apparatus according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a schematic view of a display apparatus according to an exemplary embodiment of the present invention.

In FIG. 1, the display apparatus according to an exemplary embodiment of the present invention comprises a signal input unit 100, a first circuit module 110, a video signal output unit 120, a display unit 130, a second circuit module 140, a power supply unit 150, a third circuit module 160, a universal serial bus (USB) interface unit 170, an audio output unit 180 and a light emitting unit 190.

The signal input unit 100 receives various signals from an external device (not shown), such as a PC. The signal input unit 100 comprises a D-subminiature (D-sub) connection unit 101, a digital video interface (DVI) connection unit 103 and a first USB connection unit 105.

The D-sub connection unit 101 is connected to the external device via a D-SUB cable (not shown), to receive a D-sub analog video signal from the external device. The D-sub connection unit 101 comprises a plurality of pins. Among the pins, some pins are used to transfer synchronizing signals from the external device to the display apparatus, other pins are used to transfer video signals from the external device to the display apparatus, and the remaining pins have other uses. Herein, the D-sub analog video signal may be an RGB signal.

The DVI connection unit 103 is connected to the external device via a DVI cable (not shown), to receive a DVI digital video signal from the external device. The DVI connection unit 103 also comprises a plurality of pins. Among the pins, some pins are used to transfer clock signals from the external device to the display apparatus, other pins are used to transfer synchronizing signals and video signals from the external device to the display apparatus, and the remaining pins have other uses. Herein, the DVI digital video signal may be a Transition Minimized Differential Signaling (TMDS) signal.

The first USB connection unit 105 is connected to the external device via a USB cable (not shown), to receive a USB video signal, a USB audio signal, a USB text signal and a USB control signal from the external device. The first USB connection unit 105 also comprises a plurality of pins. Among the pins, one pin is connected to a power terminal of the external device, another pin is connected to a ground terminal of the external device, and the remaining pins are used to transceive various signals, such as a video signal or an audio signal, to or from the external device.

The third circuit module 160 transceives the USB signals. The third circuit module 160 comprises a USB hub unit 161, a memory controller 163 and a first memory unit 165. The USB hub unit 161 transfers the USB signals received from the first USB connection unit 105 to the second circuit module 140 and the USB interface unit 170. The memory controller 163 transfers a display driving program stored in the first memory 165 to the external device through the first USB connection unit 105, so that the display driving program is stored in the external device.

The USB interface unit 170 comprises a second USB connection unit 172 and a third USB connection unit 174. The second USB connection unit 172 and the third USB connection unit 174 are each connected to an external display apparatus (not shown) via a USB cable, and transfer the USB signals output from the USB hub unit 161 to the external display apparatus. Alternatively, the second USB connection unit 172 and the third USB connection unit 174 are connected to another external device via the USB cable to transceive the signals.

The second circuit module 140 converts the formats of the USB signals, and comprises a decoder 141, a second memory unit 143 and a signal converting unit 145. The decoder 141 decodes the video signal from among the USB signals output from the USB hub unit 161 and transfers the decoded video signal to the signal converting unit 145 as a transistor-transistor logic (TTL) video signal. In this situation, the second memory unit 143 provides storage space required by the decoder 141 to decode the video signal. The signal converting unit 145 converts the TTL video signal into the TMDS video signal, and sends the converted video signal to the first circuit module 110.

The first circuit module 110 processes the input video signal into a signal capable of being displayed on the display apparatus. The first circuit module 110 comprises a switching unit 112 and a processor 114. The switching unit 112 switches between the video signal input through the DVI connection unit 103 and the video signal transferred from the signal converting unit 145, and outputs the signal to the processor 114. The processor 114 scales the video signal output from the switching unit 112 and the video signal input through the D-sub connection unit 101, and processes the scaled signals into displayable video signals.

If the video signal is not received from the external device through the first USB connection unit 105, the processor 114 may detect the state of the external device through the first USB connection unit 105. Specifically, the processor 114 may determine whether or not a video signal is received from the external device, using the remaining pins of the first USB connection unit 105 which are used to transceive various signals to/from the external device, or according to whether or not the TMDS video signal is output from the second circuit module 140.

If it is determined that the video signal is not received from the external device by the above processes, the processor 114 may detect the power state of the external device using the pin of the first USB connection unit 105 connected to the power terminal of the external device. The processor 114 may also detect the connection state of the external device using the pin of the first USB connection unit 105 connected to the ground terminal of the external device, and may notify a user of the detected state of the external device.

The processor 114 controls the audio output unit 180 to generate a voice message indicating the state of the external device and output the voice message. For example, if it is determined that the external device is not connected, a voice message such as "External device is not connected" may be generated and output, and if it is determined that the external device is turned off, a voice message such as "External device is turned off" may be generated and output. If it is determined that the external device is in the sleep mode, a voice message such as "External device is in sleep mode" may be generated and output.

The processor 114 also controls the light emitting unit 190 so that a light emitting diode (LED) of the light emitting unit 190 emits red, blue or green light according to the state of the external device. Additionally, the processor 114 generates a video message indicating the state of the external device, and transfers the generated video message to the video signal output unit 120.

The video signal output unit 120 outputs to the display unit 130 the video signal scaled by the processor 114 and the video message indicating the state of the external device. The video signal output unit 120 may be connected to the display unit 130 via a low voltage differential signaling (LVDS) cable, and the video signal displayed on the display unit 130 may be an LVDS video signal.

The power supply unit 150 supplies a power source required for each component. Additionally, the power supply unit 150 may supply a voltage of 5V to the first USB connection unit 105, and allow the pin, to which a voltage of 5V is supplied, to be maintained at high if the first USB connection unit 105 is not connected to the external device.

Figure 2:
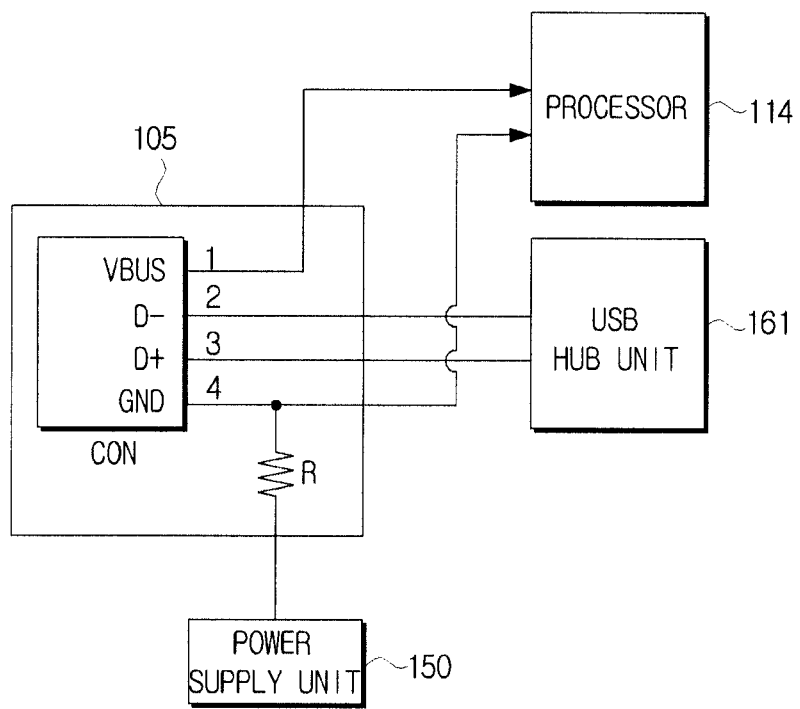
FIG. 2 is a view showing in detail a first USB connection unit of the display apparatus according to an exemplary embodiment of the present invention.

FIG. 2 is a view showing in detail the first USB connection unit 105 of the display apparatus according to an exemplary embodiment of the present invention.

In FIG. 2, the first USB connection unit 105 comprises a connector CON and a resistor R, which comply with the USB standard.

The connector CON comprises four pins. If the external device is connected to the first USB connection unit 105, a pin 1 may be connected to the power terminal of the external device, and a pin 4 may be connected to the ground terminal of the external device. Additionally, data received from the external device may be transferred to the USB hub unit 161 through a pin 2 and a pin 3.

The resistor R is connected between the pin 4 and the power supply unit 150, and is operated as a pull-up resistor.

If the connector CON is not connected to the USB cable connected to the external device, the voltage may be supplied to the pin 4 by the power supply unit 150 and the pin 4 may turn high, and the pin 1 may turn low because there is no connection to the pin 1. If the connector CON is connected to the USB cable connected to the external device, the pin 4 may be connected to the ground terminal of the external device, and may be turned from high to low. In this situation, if the external device is turned off, the pin 1 connected to the power terminal of the external device may be maintained at low, and if the external device is turned on, the power source may be supplied from the external device to the pin 1, and the pin 1 may turn high.

Accordingly, if the pin 1 and the pin 4 are detected to be high and low, respectively, and when the video signal is not displayed on the display unit 130, the processor 114 may determine that the external device is in a sleep mode. Additionally, if both pin 1 and pin 4 are detected to be low, the processor 114 may determine that the external device is turned off. Furthermore, if pin 1 and pin 4 are detected to be low and high, respectively, the processor 114 may determine that the external device is not connected to the first USB connection unit 105. The above-described states of the external device are shown in Table 1.

TABLE 1

| Pin 1 | Pin 4 | State |
|---|---|---|
| High | Low | Sleep mode |
| Low | Low | Power OFF |
| Low | High | No connection to cable |

Figure 3:
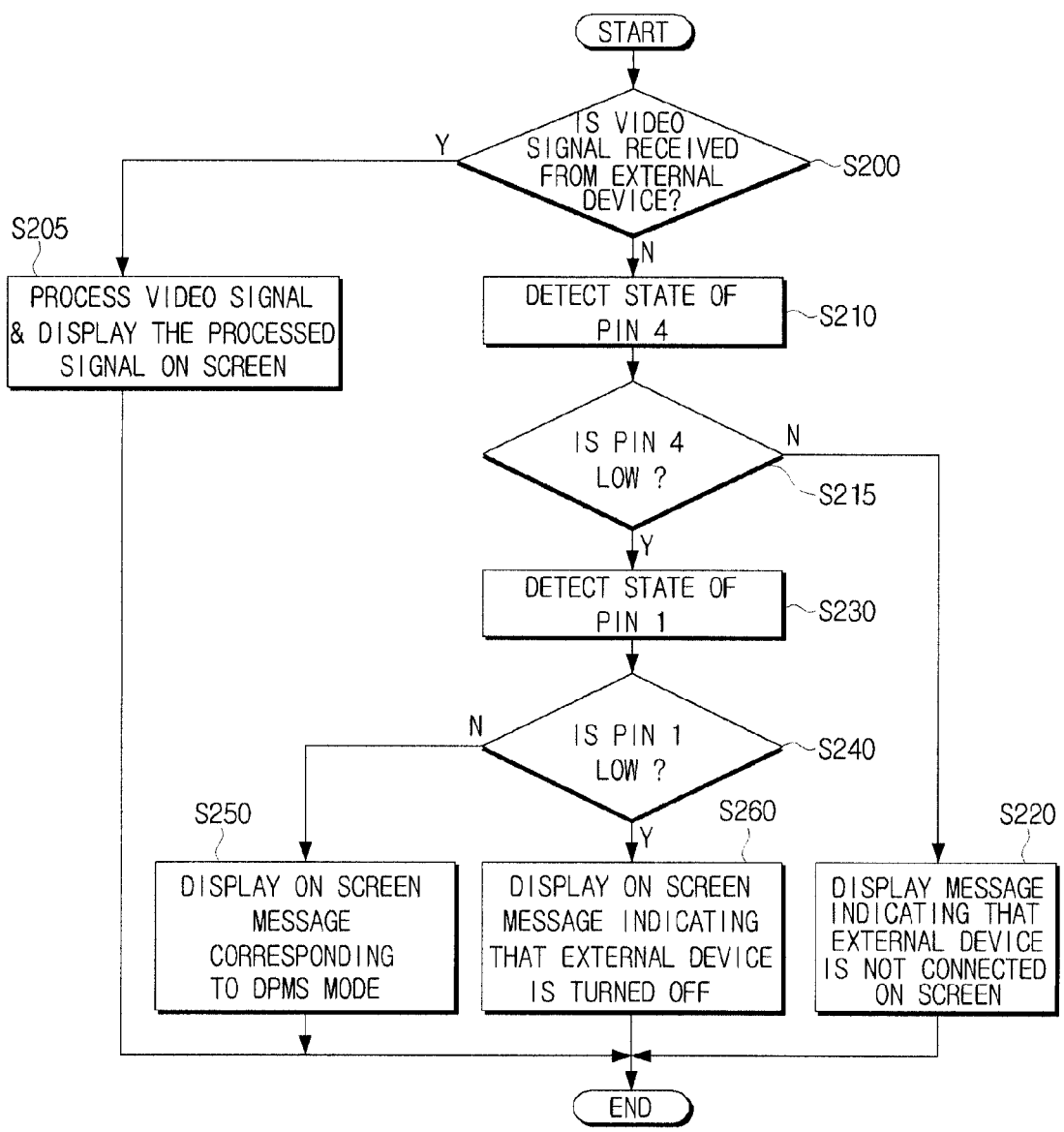
FIG. 3 is a flowchart explaining a method for displaying the state of an external device on the display apparatus according to an exemplary embodiment of the present invention.

FIG. 3 is a flowchart explaining a method for displaying the state of the external device on the display apparatus according to an exemplary embodiment of the present invention.

Referring to FIG. 3, the processor 114 determines whether or not the video signal is received from the external device (S200). Specifically, the processor 114 determines whether or not the video signal is received from the external device, according to whether or not the TMDS signal is output from the second circuit module 140.

If it is determined that the video signal is received from the external device (S200-Y), the processor 114 may control the display apparatus to process the video signal and to display the processed video signal on a screen. However, if it is determined that the video signal is not received from the external device (S200-N), the processor 114 may detect the state of the pin 4 of the first USB connection unit 105 (S210). If the pin 4 is detected to be high (S215-N), the processor 114 may allow a message notifying that the external device is not connected to be displayed on the screen (S220).

If the pin 4 is detected to be low (S215-Y), the processor 114 may detect the state of the pin 1 (S230). If the pin 1 is detected to be high (S240-N), the processor 114 may determine that the external device is in sleep mode, and may allow a message corresponding to the sleep mode of the external device to be displayed on the screen (S250).

If the pin 1 is detected to be low (S240-Y), the processor 114 may determine that the external device is connected but is turned off, and may allow a message corresponding to the determined state of the external device to be displayed on the screen (S260).

Accordingly, the messages indicating the connection state, the power state and the sleep mode of the external device may be displayed on the screen. Although the state of the external device is displayed on the screen using the messages as shown in FIG. 3, it is also possible to notify the user of the state of the external device using the audio output unit 180 and the light emitting unit 190.

Figure 4:
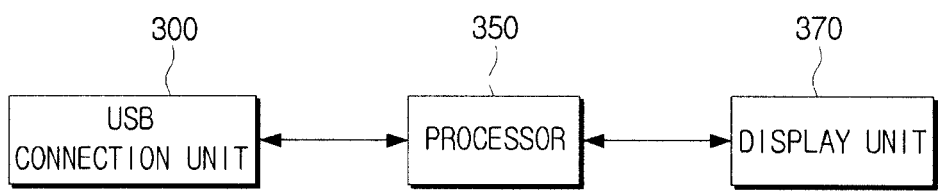
FIG. 4 is a view schematically showing a display apparatus according to another exemplary embodiment of the present invention.

FIG. 4 is a view schematically showing a display apparatus according to another exemplary embodiment of the present invention.

The display apparatus of FIG. 4 comprises a USB connection unit 300, a processor 350 and a display unit 370.

The USB connection unit 300 is connected to the external device via a USB cable (not shown), to receive a USB video signal, a USB audio signal, a USB text signal and a USB control signal from the external device. The USB connection unit 300 comprises a plurality of pins. Among the pins, one pin is connected to a power terminal of the external device, another pin is connected to a ground terminal of the external device, and the remaining pins are used to transceive various signals to/from the external device.

The processor 350 detects the state of the external device through the USB connection unit 300, and generates messages corresponding to the state of the external device. Specifically, the processor 350 detects the power state and the connection state of the external device through the pin connected to the power terminal of the external device and the pin connected to the ground terminal of the external device from among the pins of the USB connection unit 300, respectively, and then generates messages indicating the state of the external device.

More specifically, if the pin connected to the power terminal of the external device and the pin connected to the ground terminal of the external device are detected to be high and low, respectively, the processor 350 may determine that the external device is in the sleep mode. If the pin connected to the power terminal of the external device and the pin connected to the ground terminal of the external device are detected to be both low, the processor 350 may determine that the external device is turned off, and if the pin connected to the power terminal of the external device and the pin connected to the ground terminal of the external device are detected to be low and high, respectively, the processor 350 may determine that the external device is not connected.

The display unit 370 displays the messages generated by the processor 350 on a screen.

Figure 5:
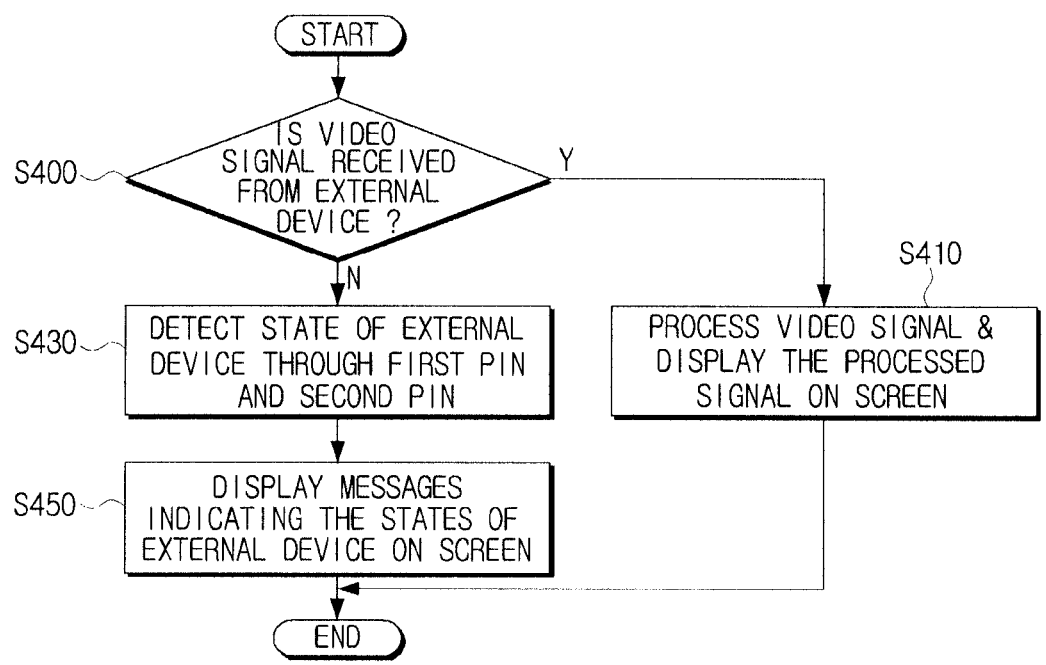
FIG. 5 is a flowchart explaining a method for displaying the state of an external device on the display apparatus according to another exemplary embodiment of the present invention.

FIG. 5 is a flowchart explaining a method for displaying the state of the external device on the display apparatus according to another exemplary embodiment of the present invention.

Referring to FIG. 5, the processor 350 determines whether or not the video signal is received from the external device (S400). If it is determined that the video signal is received from the external device, the processor 350 may control the display apparatus to process the video signal and to display the processed video signal on a screen (S410).

However, if it is determined that the video signal is not received from the external device, the processor 350 may detect the state of the external device through the first and second pins of the USB connection unit 300 (S430). Specifically, if the first pin, which is connected to the power terminal of the external device and the second pin, which is connected to the ground terminal of the external device are detected to be high and low, respectively, the processor 350 may determine that the external device is in the sleep mode. If both the first and second pins are detected to be low, the processor 350 may determine that the external device is turned off, and if the first and second pins are detected to be low and high, respectively, the processor 350 may determine that the external device is not connected.

The processor 350 enables the messages indicating the state of the external device to be displayed on the screen (S450). For example, if it is determined that the external device is in the sleep mode, if it is determined that the external device is turned off, or if it is determined that the external device is not connected, the processor 350 may control messages such as "External device is in sleep mode", "External device is turned off" and "External device is not connected" to be generated and displayed on the screen, respectively.

A user can thereby know the connection state and the power state of the external device.

Figure 6:
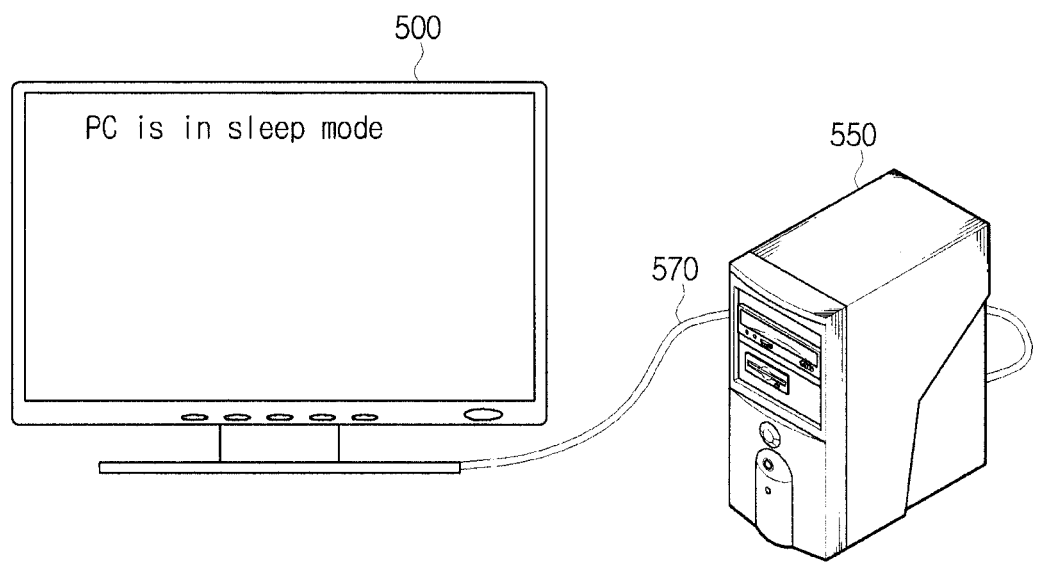
FIG. 6 is a view showing a situation in which the state of the external device is displayed on the display apparatus according to exemplary embodiments of the present invention.

FIG. 6 is a view showing a situation in which the state of the external device is displayed on the display apparatus according to exemplary embodiments of the present invention.

As shown in FIG. 6, a message such as "PC is in sleep mode" is displayed on a screen of a display apparatus 500. A PC 550 of FIG. 6 is connected to the display apparatus 500 via a USB cable 570, and the display apparatus 500 detects the state of the PC 550 through pins of a connection unit (not shown) connected to the USB cable 570.

In other words, if a pin connected to a power terminal of the PC 550 is high and a pin connected to a ground terminal of the PC 550 is low, the display apparatus 500 may determine that the PC 550 is in the sleep mode, and may generate a video message indicating the sleep mode of the PC 550, and may display the generated message on the screen, so that a user can know the state of the PC 550.

As described above, according to the exemplary embodiments of the present invention, the connection state, the power state and the sleep mode of an external device are detected and messages indicating the state of the external device are displayed on a screen, so that a user can easily know the state of the external device.

The foregoing exemplary embodiments and advantages are merely exemplary and are not to be construed as limiting the present invention.

The present teachings can be readily applied to other types of apparatuses. Also, the description of the exemplary embodiments of the present invention is intended to be illustrative, and not as limiting the scope of the claims, and many alternatives, modifications, and variations will be apparent to those skilled in the art.

What is claimed is:

1. A display apparatus comprising:
    a display unit which displays a video signal received from an external device;
    a connection unit which comprises a first pin connected to a power terminal of the external device and a second pin connected to a ground terminal of the external device; and
    a processor which detects a power state, which is one of an on mode, an off mode and a sleep mode, and a connection state of the external device through a state of the first pin and the second pin respectively, and generates a message to display the detected status of the external device on the display unit.

2. The display apparatus as claimed in claim 1, further comprising a power supply unit which supplies a power source to the connection unit; and
    a pull-up resistor which is connected between the second pin and the power supply unit.

3. The display apparatus as claimed in claim 1, wherein the connection unit complies with the universal serial bus (USB) standard.

4. The display apparatus as claimed in claim 1, wherein the processor determines that the external device is in a display power management signaling (DPMS) mode if a voltage level of the first pin is high and a voltage level of the second pin is low.

5. The display apparatus as claimed in claim 1, wherein the processor determines that the external device is turned off if a voltage level of both the first pin and the second pin is low.

6. The display apparatus as claimed in claim 1, wherein the processor determines that the external device is not connected if a voltage level of the first pin is low and a voltage level of the second pin is high.

7. The display apparatus as claimed in claim 1, wherein the processor detects the respective connection states of the first pin and the second pin when the video signal is abnormally received from the external device.

8. The display apparatus as claimed in claim 1, wherein the processor determines whether the video signal is received from the external device based on whether a Transition Minimized Differential Signaling (TMDS) video signal is input.

9. A method for displaying the state of an external device in a display apparatus, the display apparatus comprising a connection unit comprising a first pin connected to a first terminal of the external device and a second pin connected to a second terminal of the external device through a cable, the method comprising:
  detecting a power state, which is one of an on mode, an off mode and a sleep mode, and a connection state of the external device through a state of the first pin and the second pin respectively; and
  displaying a message indicating the detected status of the external device on a screen.

10. The method as claimed in claim 9, wherein the first terminal is a power terminal of the external device, and the second terminal is a ground terminal of the external device.

11. The method as claimed in claim 10, wherein the connection unit complies with the universal serial bus (USB) standard.

12. The method as claimed in claim 9, wherein the detecting comprises determining that the external device is in a display power management signaling (DPMS) mode if the voltage level of the first pin is high and the voltage level of the second pin is low.

13. The method as claimed in claim 9, wherein the detecting comprises determining that the external device is turned off if the voltage level of the first pin and second pin is low.

14. The method as claimed in claim 9, wherein the detecting comprises determining that the external device is not connected if the voltage level of the first pin is low and the voltage level of the second pin is high.

15. The method as claimed in claim 9, further comprising detecting the connection states of the first pin and the second pin when a video signal is abnormally received from the external device.

16. The method as claimed in claim 15, wherein the determining whether the video signal is received from the external device comprises determining whether a Transition Minimized Differential Signaling (TMDS) video signal is input.

17. The display apparatus as claimed in claim 7, wherein the processor detects the respective connection states of the first pin and the second pin by detecting the voltage levels of the first and second pins.

18. An external device detecting apparatus comprising:
  a connection unit which comprises a first pin connected to a power terminal of the external device and a second pin connected to a ground terminal of the external device; and
  a processor which detects a power state, which is one of an on mode, an off mode and a sleep mode, and a connection state of the external device through a state of the first pin and the second pin respectively, and generates a message to display the detected status of the external device on a display unit.

19. The display apparatus as claimed in claim 1, wherein the power state of the external device comprises a sleep mode and a power mode and the connection state of the external device comprises a connection state of a cable connected to the external device.

20. The method as claimed in claim 9, wherein the power state of the external device comprises a sleep mode and a power mode and the connection state of the external device comprises a connection state of the cable connected to the external device.

21. The external device as claimed in claim 18, wherein the power state of the external device comprises a sleep mode and a power mode and the connection state of the external device comprises a connection state of a cable connected to the external device.

* * * * *